3,240,608
MARGARINE OIL AND METHOD OF MAKING
Werner H. Schmidt, Tenafly, John P. McNaught, Saddle River, and Kenneth S. Baker, Tenafly, N.J., assignors to Lever Brothers Company, New York, N.Y., a corporation of Maine
No Drawing. Filed Aug. 30, 1962, Ser. No. 220,575
6 Claims. (Cl. 99—122)

This invention relates to improved margarines containing a high level of liquid safflower oil.

Considerable commercial interest has recently been shown in margarines containing a high level of essential fatty acids, and, more importantly, a favorable ratio of essential fatty acids to saturated fatty acids. The demand for margarines having these characteristics has been occasioned by a consumer trend away from diets containing high levels of the saturated fatty acids. The Melnick et al., U.S. Patent No. 2,955,039, describes a number of considerations involved in preparing margarines having these desirable characteristics.

Safflower oil, because of its extremely high level of linoleic acid and its favorable ratio of essential fatty acids to saturated fatty acids is a highly desirable liquid vegetable oil component of margarines. However, the preparation of a margarine having a high level of liquid safflower oil presents a number of problems. For example, a margarine, the oil phase of which contains 50% of liquid safflower oil, with the balance made up of usual margarine hard stocks comprising hydrogenated soybean oil, cottonseed oil or mixtures thereof, is too soft at room temperature and has an undesirable salve-like consistency. If the hard stock used is hydrogenated to a greater extent, the resulting margarines are waxy and too slow-melting in the mouth, and are completely unacceptable.

It has now been found that a margarine having highly acceptable eating characteristics, appearance, and handling properties, and which at the same time, contains from about 35% to about 50% of liquid safflower oil in the oil phase, is provided by using a hard stock containing at least one part by weight of a selectively hydrogenated peanut oil for each two parts by weight of the liquid safflower oil present. In addition, the hard stock must meet the Wiley melting point and dilatation limits set forth below. Quite surprisingly, if the above requirements are observed, a margarine is provided having the desirable liquid, unhydrogenated safflower oil present at a high level, and which, at the same time, has completely acceptable oral melting characteristics, as well as an acceptable firmness as measured by penetration tests and bleeding studies.

Thus, the margarines of the present invention contain, in the oil phase, about 50% of a liquid vegetable oil which contains at least 70% safflower oil and about 50% of a selectively hydrogenated vegetable oil as a hard stock. The hard stock preferably contains an amount of hydrogenated peanut oil equal to the amount of safflower oil present in the margarine. As a lower limit, at least one part by weight of hydrogenated peanut oil must be present for each two parts by weight of the liquid safflower oil. In addition, the hard stock prior to blending with the safflower oil must have a Wiley melting point within the range of about 102° F. to about 110° F. Furthermore the hard stock must have a dilatation at 20° C. of from about 1000 to about 1400, a dilatation at 36° C. of from about 150 to about 375, and a dilatation at 42° C. of from 0 to about 50.

The liquid unhydrogenated vegetable oil comprises about 50% of the total oil phase of the margarines of this invention. In the preferred margarines, liquid safflower oil makes up the entire liquid oil component. Where lesser amounts of safflower oil, down to the lower limit of about 70% of the liquid oil is used, the balance is made up of other edible liquid unhydrogenated oils such as peanut, cottonseed, soy, corn, sunflower, and the like.

Within the limitations set forth above, the hard stock may contain hydrogenated vegetable oils other than peanut oil. Suitable additional vegetable oils useful in the hard stock component include soybean oil, cottonseed oil, safflower oil, palm oil, corn oil, sunflower and other similar vegetable oils. According to customary practice, the hard stock may be made by either combining the unhydrogenated vegetable oils in desired proportions and then subjecting the mixture to hydrogenation conditions; or, the individual oils may be hydrogenated separately to the desired degree, and thereafter blended in desired proportions to provide a hard stock having the desired dilatation and melting point characteristics.

In preparing the completed margarines according to this invention, a hard stock having the characteristics described above is combined with the liquid safflower oil and the mixture processed to provide a finished margarine having a Wiley melting point within the range of from about 94° F. to about 100° F. In addition, the finished margarine must have a dilatation at 20° C. of from about 400 to about 550, a dilatation at 36° C. of from about 75 to 0 and a dilatation at 42° C. of 0. It will be recognized by those skilled in the art that the dilatation limits set forth for the completed margarine are governed by the following considerations. A margarine having a dilatation of 400 at 20° C. and a dilatation of 0 at both 36° C. and 42° C. will be unacceptably soft. Conversely, a margarine having a dilatation of 550 at 20° C., a dilatation of 75 at 36° C., and a dilatation of 0 at 42° C. will be extremely slow melting and therefore undesirable. The above limitations are thought to be accurately descriptive of the margarine of this invention, however, inasmuch as a margarine having a dilatation of 400 at 20° C., a dilatation of 75 at 36° C., and of 0 at 42° C. will be acceptable.

As mentioned above, the vegetable oils used as a hard stock in the margarines of this invention are selectively hydrogenated. The term "selective" is used to designate these hydrogenation conditions which favor absorption of the hydrogen by the fatty acids containing active methylene groups, such as linoleic acid as opposed to those containing no active methylene groups, such as oleic acid. Hydrogenation conditions known to effect the selectivity of hydrogenation procedures include variations in pressure, temperature, agitation and the type of catalyst employed. While each of these factors are of importance, it is generally considered that the temperature at which the hydrogenation is conducted has the greatest effect. At hydrogenation temperatures below 250° F., the hydrogenation is likely to be non-selective in character. The hydrogenated hard stock used in the present invention are preferably hydrogenated at temperatures between 375–410° F., using a catalyst known to provide a selective hydrogenation.

For the determination of dilatations for the purpose of this specification, a method and apparatus similar to those given in Section C–IV, 3e (52) of the "D.G.F. Einheitsmethoden," published by the Deutsche Gesellschaft für Fettwissenschaft e.V. is used.

In the melting of fats, a characteristic change of volume is observed which, especially in the case of fats solid at the normal room temperature, manifests itself in a sudden increase in the volume.

The dilatation or isothermal melting expansion of a fat is the volume increase, expressed in microliters, as determined under the conditions of the following procedure and referred to 25 g., the reference temperature being given.

The dilatometer is of glass and consists of a vertical graduated capillary tube poined at its lower end by a U-shaped capillary tube to a glass bulb surmounted by a neck which is internally ground to take a hollow ground glass stopper. The Best et al. U.S. Patent No. 3,012,891 discloses a similar apparatus. The overall length of the capillary tube is 12.5 inches. The capillary tube contains graduations extending over a length of about 10.25 inches. The 0 graduation starts at a level of about ½ inch below the top of the ground neck of the bulb. The capillary tube is designed to contain from .825 to .9 ml. of fluid and is graduated in 0.005 ml. divisions. The internal diameter of the bulb neck is ½ inch at the top. The bulb has a volume of 8 ml. (not over 8 ml., nor less than 7 ml.). The bulb of the instrument is below the level of the graduations on the capillary tubing. The stopper to be inserted in the mouth of the bulb is about 3.5 inches in length (including the ground portion) and is hollow and is partly filled with lead shot to hold it firmly in place while a dilation is being determined.

1 ml. of a 1% potassium dichromate solution is pipetted into the bulb of the dilatometer. The dilatometer is then weighed. A sample of the fat to be examined is thoroughly degassed by heating at 60–70° C. under vacuum. The fat (at about 60° C.) is then poured into the bulb of the dilatometer and the ground glass stopper is inserted, care being taken not to include any air. The amount of fat added is such that, during the determination, the level of dichromate solution never falls below the lowest of the graduations and never rises above the top of the graduations. If the initial solution level, on filling, is about two-thirds of the height of the graduated capillary, these conditions are usually fulfilled. The dilatometer is reweighed to obtain the weight of fat added. It is then placed at 60° C. to insure complete melting, then cooled to 42° C., and a reading of the level of the solution in the capillary is made after 15 minutes. This is the "reference" or "base reading."

The filled dilatometer is chilled in an ice water bath at approximately 0° C. for 70 minutes. It is then allowed to warm in a water bath to 20° C., the dilatometer being immersed to such a depth that the water level is above the middle of the ground glass stopper. It is maintained at this temperature for 40 minutes and a reading is taken. It is then placed in a water bath at 36° C. for 35 minutes, and a second reading taken. Finally, it is placed in a water bath at 42° C. for 20 minutes and a final reading taken.

In order to convert the reading taken above to dilatation values for a 25 gram sample, the following calculations are made:

(1) A factor F is determined according to the formula:

$$F = \frac{25}{\text{weight of fat in dilatometer}}$$

(2) The value of the dilatation is calculated from the formula:

$$D_t = F(R - R') - K$$

where $D_t$ = dilatation at $t$° C.,
$F$ = factor determined above,
$R$ = reference reading taken at 42° C. prior to icing,
$R'$ = reading of the capillary at $t$° C.,
$K$ = constant thermal expansion correction factor given in the table below:

| $t$ °C. | K |
| --- | --- |
| 20 | 430 |
| 36 | 120 |
| 42 | 0 |

The penetration values referred to herein are determined by means of a well established test procedure, and is an indication of the hardness of the margarine at a specific temperature. In conducting the test, a ¼ lb. print of margarine is held at 45° F. for 2 days to establish uniform base conditions. The print is then unwrapped and held at the test temperature, i.e., 45° F. (7.2° C.) or 70° F. (21° C.) for 24 hours. A Precision Universal Penetrometer was used, with a 47 gram needle of the standard cone design. The needle is dropped 20 mm. into the print of margarine and the depth to which the needle penetrates the margarine is measured in tenths of a millimeter. This reading provides the penetration value.

The high temperature stability of the margarine was determined by observing the amount of collapse and bleeding (liquid oil formation) which occurs when a print of the margarine is held at 80° F. for five hours. The amount of collapse is determined by visual observation. The bleeding is determined by placing the print on brown Kraft paper during the five hour period and by thereafter measuring the area of staining, exclusive of the stained area caused by the original print surface. A stained area of 3.1 to 8.0 square inches is considered moderate, while an area of over 15 square inches is considered excessive.

The improved characteristics of the margarines of this invention are clearly apparent from subjective tests, such as the physical appearance and oral melting characteristics. The improvement can also be measured in terms of the penetration values obtained at 70° F. and the bleeding characteristics of the margarine at 80° F. according to the procedures set forth above. The ranges of penetration values found to provide an acceptable product in a margarine containing 50% of an edible liquid unhydrogenated vegetable oil is 155 to 192. If the product has a penetration above this range, it is too soft and undergoes excessive collapse and bleeding at room temperatures. A penetration below this range would indicate a margarine having an undesirably low rate of oral melting. It is noted that in margarines containing a lower proportion of liquid unhydrogenated vegetable oils and a high proportion of hydrogenated oils, an acceptable product having higher penetration values at 70° F. may be found. For example, one acceptable commercial product has a penetration of 260 at 70° F. By comparison, a margarine containing 50% of a liquid oil and formulated to a penetration of 260 at 70° F., would appear greasy and thus commercially unattractive.

The following examples are further illustrative of the improved margarines of this invention.

EXAMPLE I

Table 1 below gives a number of examples of the margarines of the present invention. For the purpose of comparison, a number of margarines outside the present invention are also given. The oil phase of each of these margarines contains a safflower oil having an iodine value of between 141 and 145, a maximum Lovibond bleached color of 2.0, a crude free fatty acid content of less than 1.0% and passes the AOCS cold test of 5½ hours.

The hard stocks used in preparing the margarines vary in composition as indicated in Table 1. Each hard stock is characterized in terms of its vegetable oil composition as well as its dilatation values and melting point.

The total oil phase of each margarine in Table 1 contained 50% by weight of liquid, unhydrogenated safflower oil and 50% by weight of the indicated hard stock.

Each of the margarines given in the table have the following composition:

| | Percent |
|---|---|
| Fat | 79.2 |
| Water | 16.4 |
| Monodiglyceride emulsifier | 0.5 |
| Non-fat milk solids | 1.5 |
| Salt | 2.0 |
| Lecithin | 0.2 |
| Benzoate of soda | 0.1 |
| Vitamins, color, etc. | 0.1 |

The margarines listed in the table were prepared by first subjecting the oils to the usual refining and bleaching procedures. The hard stock was prepared by first blending the unhydrogenated oils and then selectively hydrogenating the blend at a temperature of 190–210° C. and at a pressure of 5–20 lbs. per square inch, using 0.1% of a well spent nickel catalyst.

The liquid safflower oil and the hard stock were then blended, and subjected to further bleaching and deodorization. The oil was then placed in a margarine churn, and the lecithin, monodiglyceride emulsifier, vitamins, and color were thoroughly mixed.

An aqueous phase comprising non-fat solids, water, salt and benzoate of soda were separately mixed and then added to the oil blend in the churn. This mixture was then agitated to insure uniform dispersion, and then the complete margarine was prepared therefrom by use of a pilot plant Votator system employing a precrystallization step as described in the Schmidt et al. U.S. Patent No. 2,772,976, using 80% recirculation. The final product was formed into ¼ lb. prints.

The dilatation and penetration values specified in Table 1 were obtained by the methods outlined above in the application. The extracted oil referred to was obtained by melting the finished margarine and separating the oil and water phases by decantation.

Table 1
[50% liquid safflower oil margarines]

| Margarine No. | 1 | 2 | 3 | 4 | 5 | 6 | 7 | 8 |
|---|---|---|---|---|---|---|---|---|
| Hard Stock Composition: | | | | | | | | |
| Percent Peanut Oil | 96 | 70 | 48 | 2 | | | | |
| Percent Soybean Oil | 2 | 28 | 45 | 2 | 80 | 90 | 70 | |
| Percent Cottonseed Oil | 2 | 2 | 7 | 96 | 20 | 10 | 5 | |
| Percent Safflower Oil | | | | | | | 25 | |
| Percent Palm Oil | | | | | | | | 100 |
| Hard Stock Dilatation Values: | | | | | | | | |
| 20° C | 1,278 | 1,259 | 1,257 | 1,309 | 1,328 | 1,331 | 1,326 | 1,406 |
| 36° C | 246 | 229 | 223 | 198 | 217 | 221 | 270 | 225 |
| 42° C | 0 | 0 | 0 | 0 | 0 | 0 | 0 | 0 |
| Wiley Melting Point of Hard Stock, °F | 104.8 | 104.4 | 104.4 | 104.3 | 104.6 | 104.7 | 106.1 | 105.6 |
| Dilatation Values of Oil Extracted From Finished Margarine: | | | | | | | | |
| 20° C | 480 | 471 | 455 | 470 | 467 | 485 | 472 | 472 |
| 36° C | 34 | 36 | 26 | 12 | 10 | 33 | 17 | 24 |
| 42° C | 0 | 0 | 0 | 0 | 0 | 0 | 0 | 0 |
| Wiley Melting Point (°F.) of Oil Extracted From Finished Margarine | 96.9 | 96.9 | 96.7 | 96.3 | 96.2 | 96.9 | 96.4 | 96.6 |
| Penetration at 70° F. of Finished Margarine | 160 | 172 | 192 | 212 | 228 | 213 | 218 | 254 |
| Percent Hardened Peanut Oil Over-All | 48 | 35 | 24 | 1 | | | | |

Referring to Table 1, margarines 1, 2 and 3 are margarines made according to this invention. They have penetration values at 70° F. ranging between 160 and 192, and have excellent eating qualities and appearance. These margarines are firm up to 80° F., give pleasing melting characteristics in the mouth and have satisfactory spreadability at refrigerator temperatures. As noted, oil phases of each of margarines 1, 2 and 3 contain 50% by weight of liquid unhydrogenated safflower oil, and hydrogenated peanut oil is present in the hard stock in ratios of about 1:1, 0.7:1, and 0.5:1, respectively, with respect to the liquid safflower oil present.

Margarines 4 through 8 are outside the scope of the present invention and have inferior characteristics. Each is unacceptably soft, as shown by the high penetration values, and is greasy in appearance.

EXAMPLE II

Table 2 below gives additional examples of the margarines of this invention in which the total oil phase contains 50% by weight of liquid unhydrogenated vegetable oil (35% of liquid unhydrogenated safflower oil and 15% of liquid unhydrogenated cottonseed oil) and 50% by weight of the indicated hard stock. The safflower oil used had the same characteristics as those given in Example I. Also, the hard stocks and finished margarines were prepared by the procedures outlined in Example I and the finished margarine was made according to the formula there set forth.

Table 2
35% liquid safflower oil-15% liquid cottonseed oil margarines

| Margarine No. | 9 | 10 | 11 | 12 | 13 |
|---|---|---|---|---|---|
| Hard Stock Composition: | | | | | |
| Percent Peanut Oil | 70 | 70 | 48 | | |
| Percent Soybean Oil | 28 | 2 | 45 | 80 | 90 |
| Percent Cottonseed Oil | 2 | 28 | 7 | 20 | 10 |
| Hard Stock Dilatation Values: | | | | | |
| 20° C | 1,270 | 1,287 | 1,266 | 1,343 | 1,319 |
| 36° C | 202 | 258 | 245 | 207 | 233 |
| 42° C | 0 | 0 | 0 | 0 | 0 |
| Wiley Melting Point of Hard Stock, °F | 104.1 | 105.2 | 104.6 | 104.7 | 106.3 |
| Dilatation Values of Oil Extracted From Finished Margarine: | | | | | |
| 20° C | 469 | 483 | 465 | 481 | 482 |
| 36° C | 27 | 29 | 32 | 16 | 38 |
| 42° C | 0 | 0 | 0 | 0 | 0 |
| Wiley Melting Point (°F.) of Oil Extracted From Finished Margaine | 96.7 | 96.8 | 96.8 | 96.4 | 97 |
| Penetration at 70° F. of Finished Margarine | 155 | 155 | 179 | 217 | 214 |
| Percent Hardened Peanut Oil Over-All | 35 | 35 | 24 | | |

Referring to Table 2, margarines 9, 10 and 11 are margarines made according to the present invention and have penetration values at 70° F. ranging from 155 to 179. Each of these three margarines is non-greasy in appearance, and has a firm, non-salvy texture. Their eating qualities are excellent. As noted, the oil phases of each of these margarines contain 35% by weight of liquid unhydrogenated safflower oil and 15% by weight of liquid unhydrogenated cottonseed oil for a total liquid oil content of 50%. The ratios of hydrogenated peanut oil to liquid safflower oil in margarines 9, 10 and 11 are 1:1, 1:1, and about 0.1:1, respectively.

Margarines 12 and 13 of Table 2 are outside the scope of the present invention. Each is unacceptably soft, as shown by the high penetration values, and is greasy in appearance.

EXAMPLE III

A preferred margarine according to this invention was made by first blending a liquid unhydrogenated safflower oil and hydrogenated peanut oil in approximately equal proportions. The hydrogenated peanut oil was prepared by the selective hydrogenated procedures outline in Example I and had a dilatation at 20° C. of 1260, a dilatation at 36° C. of 170 and a dilatation at 42° C. of 0.

A margarine was prepared from this oil blend according to the procedure and formula outlined in Example I. The oil phase of the margarine had an iodine value of 102.6, a dilatation of 20° C. of 467, a dilatation at 36° C. of 28 and a dilatation at 42° C. of 0. The margarine had a penetration value at 45° F. of 96, and a good spreadability at 45° F. It had a penetration value at 70° F. of 168. The degree of collapse of a ¼ lb. print of the margarine at 80° F. after five hours was very slight.

We claim:
1. A margarine, the total oil phase of which consists essentially of an edible vegetable oil having a melting point of from about 94° F. to about 100° F., a dilatation at 20° C. of from about 400 to about 550, a dilatation at 36° C. of from about 75 to 0, and a dilatation at 42° C. of 0, about 50% of the edible vegetable oil consisting essentially of a liquid, unhydrogenated vegetable oil, at least 70% of which is liquid unhydrogenated safflower oil, and about 50% of the edible vegetable oil consisting essentially of a selectively hydrogenated vegetable oil hard stock, the hard stock containing selectively hydrogenated peanut oil in a weight ratio to the liquid safflower oil present in the finished margarine of at least 1:2.

2. A margarine, the total oil phase of which consists essentially of an edible vegetable oil having a melting point of from about 94° F. to about 100° F., a dilatation at 20° C. of from about 400 to about 550, a dilatation at 36° C. of from about 75 to 0, and a dilatation at 42° C. to 0, about 50% of the edible vegetable oil consisting essentially of liquid unhydrogenated safflower oil, and the remainder of the oil including at least about 25% by weight of a hardened selectively hydrogenated peanut oil.

3. A margarine, the total oil phase of which consists essentially of, on a weight basis, about 50% of an edible liquid unhydrogenated vegetable oil and about 50% of a selectively hydrogenated vegetable oil hard stock, the liquid oil containing at least 70% liquid unhydrogenated safflower oil, and the hard stock having a melting point of about 102° F. to about 110° F., a dilatation at 20° C. of from about 1000 to about 1400, a dilatation at 36° C. of about 150 to about 375, and a dilatation at 42° C. of 0 to about 50, the hard stock containing hydrogenated peanut oil at a level of at least one part by weight for each two parts by weight of liquid safflower oil in the finished margarine.

4. A margarine, the total oil phase of which consists essentially of about 50% by weight of liquid unhydrogenated safflower oil and about 50% by weight of a hardened selectively hydrogenated vegetable oil having a melting point of about 102° F. to about 110° F., a dilatation at 20° C. of about 1000 to about 1400, a dilatation at 36° C. of about 150 to 375, and a dilatation at 42° C. of 0 to about 50, at least about half of the hydrogenated vegetable oil being hydrogenated peanut oil.

5. The process of making an edible vegetable oil which comprises blending a liquid unhydrogenated vegetable oil with a selectively hydrogenated vegetable oil hard stock in a ratio of about 1:1, the liquid oil having a liquid unhydrogenated safflower content of from about 70% to 100%, the hard stock having a melting point of about 102° F. to about 110° F., a dilatation at 20° C. of from about 1000 to about 1400, a dilatation at 36° C. of about 150 to about 375, and a dilatation at 42° C. of 0 to about 50, and the hard stock further containing selectively hydrogenated peanut oil at a level of at least one part by weight for each two parts by weight of liquid safflower oil in the blended oil.

6. The process of making an edible vegetable oil which comprises blending a liquid unhydrogenated safflower oil with a selectively hydrogenated vegetable oil hard stock in the ratio of about 1:1, the hard stock having a melting point of about 102° F. to about 110° F., a dilatation at 20° C. of from about 1000 to about 1400, a dilatation at 36° C. of about 150 to about 375, and a dilatation at 42° C. of 0 to about 50, and the hard stock further containing at least 50%, by weight, of a selectively hydrogenated peanut oil.

References Cited by the Examiner
UNITED STATES PATENTS

| | | | |
|---|---|---|---|
| 2,890,959 | 6/1959 | Phillips | 99—123 |
| 2,955,039 | 10/1960 | Melnick et al. | 99—122 |

A. LOUIS MONACELL, *Primary Examiner.*

ABRAHAM H. WINKELSTEIN, *Examiner.*